US008959714B2

United States Patent
Hsu

(10) Patent No.: US 8,959,714 B2
(45) Date of Patent: *Feb. 24, 2015

(54) DUAL-SHAFT SYNCHRONOUS MOTION DEVICE

(71) Applicant: First Dome Corporation, New Taipei (TW)

(72) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/911,201

(22) Filed: Jun. 6, 2013

(65) Prior Publication Data

US 2014/0223693 A1 Aug. 14, 2014

(30) Foreign Application Priority Data

Feb. 8, 2013 (TW) .............................. 102203060 U

(51) Int. Cl.
*E05D 3/06* (2006.01)
*E05F 1/08* (2006.01)
*F16H 19/08* (2006.01)

(52) U.S. Cl.
CPC ....................................... *E05D 3/06* (2013.01)
USPC .................... 16/287; 16/342; 16/366; 16/294

(58) Field of Classification Search
USPC ........... 16/354, 366, 365, 368, 369, 370, 342, 16/227; 361/679.08, 679.11, 679.02, 361/679.15, 679.27; 455/90.3, 575.1, 455/575.3, 575.8; 379/433.12, 433.13; 348/373, 333.01, 333.06, 794
See application file for complete search history.

(56) References Cited

U.S. PATENT DOCUMENTS

| 3,163,883 | A * | 1/1965 | Nils ................................. 16/354 |
| 2005/0050686 | A1 * | 3/2005 | Kurokawa ....................... 16/354 |
| 2005/0122671 | A1 * | 6/2005 | Homer ........................... 361/681 |
| 2008/0109995 | A1 * | 5/2008 | Kuwajima et al. .............. 16/354 |
| 2008/0216288 | A1 * | 9/2008 | Hoffman ........................ 16/354 |
| 2009/0000062 | A1 * | 1/2009 | Yamanami ...................... 16/366 |
| 2009/0282650 | A1 * | 11/2009 | Jin et al. ......................... 16/367 |
| 2010/0024169 | A1 * | 2/2010 | Self ................................. 16/354 |
| 2010/0071159 | A1 * | 3/2010 | Myung .......................... 16/303 |
| 2011/0000136 | A1 * | 1/2011 | Brun .............................. 49/358 |
| 2011/0157780 | A1 * | 6/2011 | Wang et al. ............. 361/679.01 |
| 2011/0205695 | A1 * | 8/2011 | Hassemer et al. ....... 361/679.01 |
| 2011/0289728 | A1 * | 12/2011 | Wang et al. ..................... 16/337 |
| 2012/0047685 | A1 * | 3/2012 | Ma et al. ......................... 16/319 |
| 2013/0135809 | A1 * | 5/2013 | Uchiyama et al. ....... 361/679.09 |

FOREIGN PATENT DOCUMENTS

| EP | 1983201 A1 * | 10/2008 |
| JP | 2006064000 A * | 3/2006 |
| JP | 2008141712 A * | 6/2008 |

* cited by examiner

*Primary Examiner* — Chuck Mah
(74) *Attorney, Agent, or Firm* — Rosenberg, Klein & Lee

(57) ABSTRACT

A dual-shaft synchronous motion device includes a first shaft and a second shaft; a first rotor and a third rotor disposed on the first shaft and turned synchronously; a second rotor and a fourth rotor disposed on the second shaft and turned synchronously; and a tractive member disposed between the first rotor (the third rotor) and the second rotor (the fourth rotor). When the first shaft drives the first and third rotors to turn, the tractive member brings the second rotor to turn reversely relative to the first rotor. The fourth rotor makes the tractive member drive the third rotor so that the first and second shafts are turned synchronously.

27 Claims, 5 Drawing Sheets

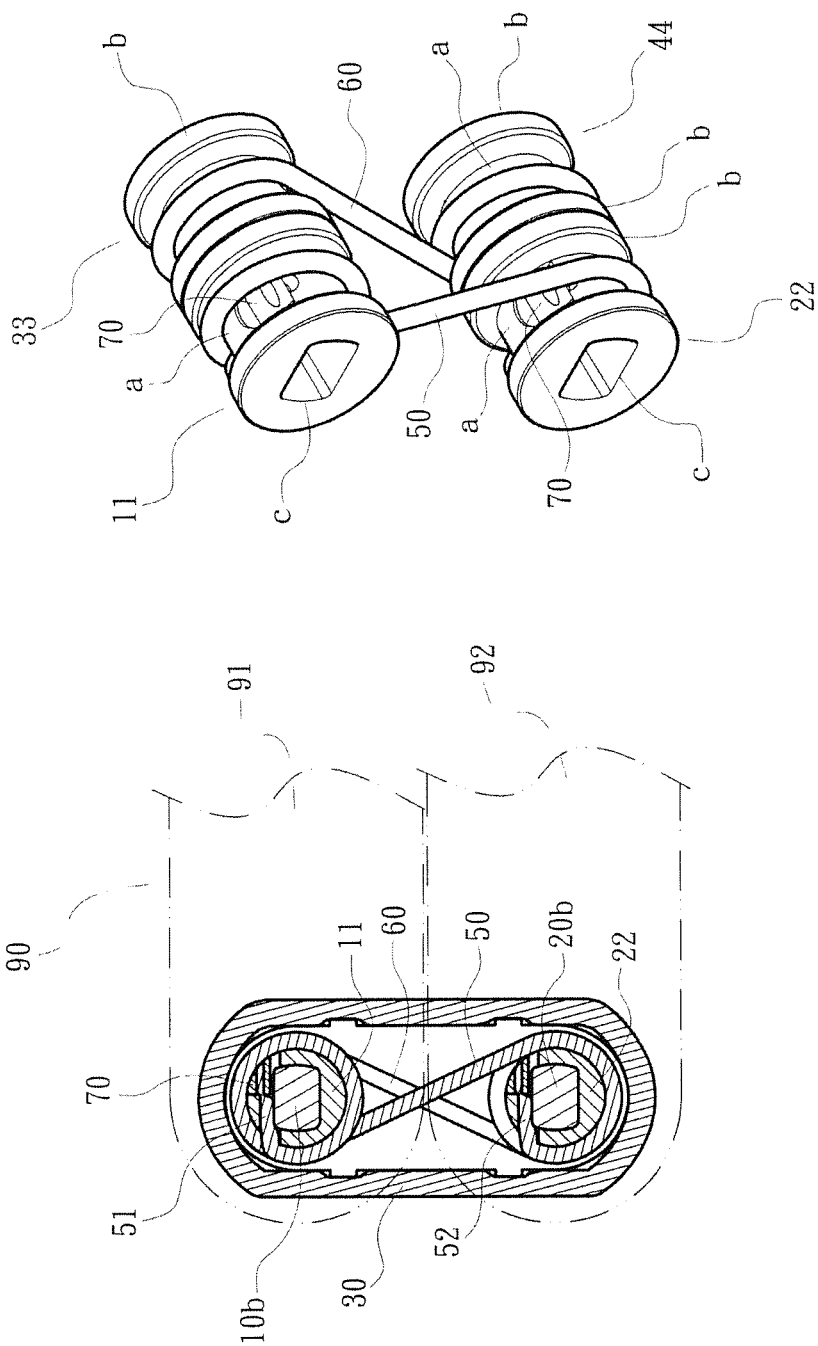

DUAL-SHAFT SYNCHRONOUS MOTION DEVICE

BACKGROUND OF THE INVENTION

1. Field of the Invention

The present invention relates to a dual-shaft synchronous motion device, and more particularly to a pivot shaft in cooperation with rotors and tractive members so that first and second shafts are turned synchronously.

2. Description of the Prior Art

A pivot or a turning shaft which can be turned back and forth by applying an external is widely used to en electronic article, such as a cell phone, a notebook, a PDA, a digital camera, an electronic book and the like, so that its cover, display screen, or a watch window can be turned to open/close. For example, Taiwan Patent No. 97222022 discloses a turning shaft structure; Taiwan Patent No. 96217011 discloses a pivot positioning structure; and Taiwan Patent No. 98207366 discloses a pivot structure.

For the display module (such as, a screen) and/or the machine body module of the electronic article to provide more operation modes and applied range, the prior art also discloses a dual shaft disposed between the display module and the machine body module. For example, Taiwan Patent No. 96148572 discloses a super-wide angle dual turning shaft structure; Taiwan Patent No. 99211350 discloses a dual pivot hinge.

Regarding the operation, motion and configuration of the prior art, the pivot or turning shaft assembly usually includes a plurality of through holes, concave and convex spacers for positioning, friction plates and springs which are assembled to the turning shafts. Two ends of the turning shaft are respectively positioned by buckles or fixtures. The turning shaft or pivot assembly is turned and positioned by the springs to store and release energy.

Typically, if the configuration of the turning shaft and the related parts can be changed, it will be used widely and convenient for assembly.

According to the aforesaid, the topics to consider the design of configuration and the techniques are as follows:

1. Providing a synchronous motion device disposed between the display module and the machine body modules. When the display module is turned 0-180 degrees, the machine body module will be relatively turned 0-180 degrees. The total turning angle of the display module and the machine body module can achieve 360 degrees. Under the condition that the electronic product has various operation modes (or applied range), it provides an easy and convenient operation effect.

2. The synchronous motion device should remove the through holes, the concave and convex spacers for positioning, the friction plates and the springs. The turning shaft or pivot assembly is turned and positioned by the springs to store and release energy. The aforesaid patents don't teach or disclose these topics.

Accordingly, the inventor of the present invention has devoted himself based on his many years of practical experiences to solve these problems.

SUMMARY OF THE INVENTION

The primary object of the present invention is to provide a dual-shaft synchronous motion device. The dual-shaft synchronous motion device comprises a first shaft and a second shaft; a first rotor and a third rotor disposed on the first shaft and turned synchronously; a second rotor and a fourth rotor disposed on the second shaft and turned synchronously; and a tractive member disposed between the first rotor (the third rotor) and the second rotor (the fourth rotor). When the first shaft drives the first and third rotors to turn, the tractive member brings the second rotor to turn reversely relative to the first rotor. The fourth rotor makes the tractive member drive the third rotor so that the first and second shafts are turned synchronously.

The tractive member is in the form of a cable and has a first end and a second end. The first and second ends of the tractive member are respectively wound and fixed to the first rotor (the third rotor) and the second rotor (the fourth rotor).

The first and second rotors (or the third and fourth rotors) cooperate with the configuration of the tractive member so the torsion change of turning is decreased to the least for the first and second shafts to have a smooth turning. Besides, when the operator stops the operation of turning, the first and second shafts immediately stops turning to form a positioning effect.

After the first rotor is turned 180 degrees along with the first shaft, the length of the tractive member (or the first end), wound on the first rotor, is at least equal to or greater than a half of the periphery of the first rotor. That is to say, after the first rotor is turned 180 degrees, the length of the first end of the tractive member, wound on the first rotor, is equal to or greater than the (periphery) distance that the first rotor is turned 90 degrees.

BRIEF DESCRIPTION OF THE DRAWINGS

FIG. 3 is a sectional view of FIG. 2, wherein the broken lines show the position of the display module and the machine body module;

FIG. 4 is a perspective view of the first-four rotors and the tractive members of FIG. 3 to show the winding state of the first and second ends of the tractive members;

DETAILED DESCRIPTION OF THE PREFERRED EMBODIMENTS

Embodiments of the present invention will now be described, by way of example only, with reference to the accompanying drawings.

Figure 1:
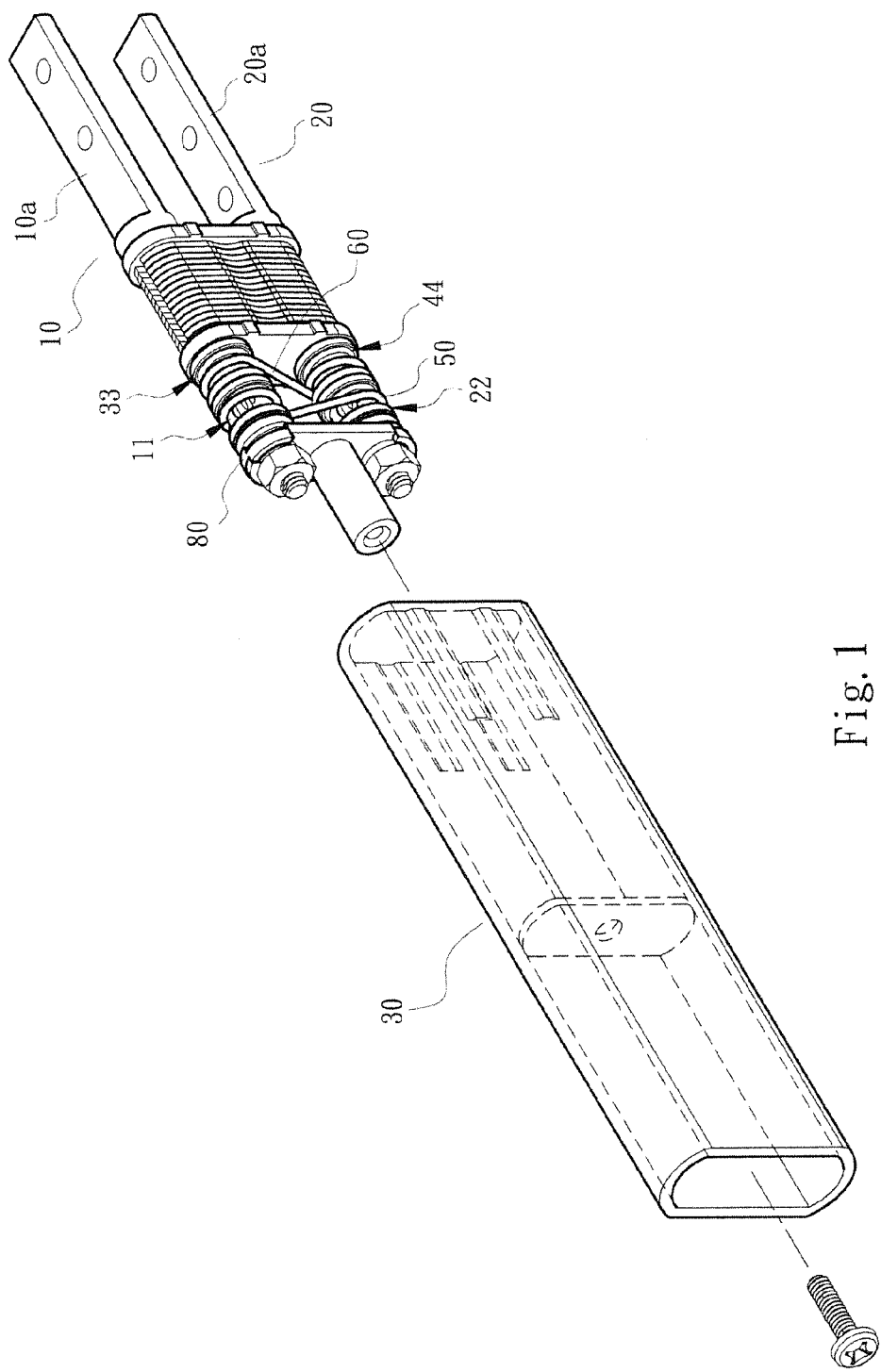
FIG. 1 is a perspective view showing the first and second shafts, the first-fourth rotors, the tractive members and the casing of the present invention and the casing.
Figure 2:
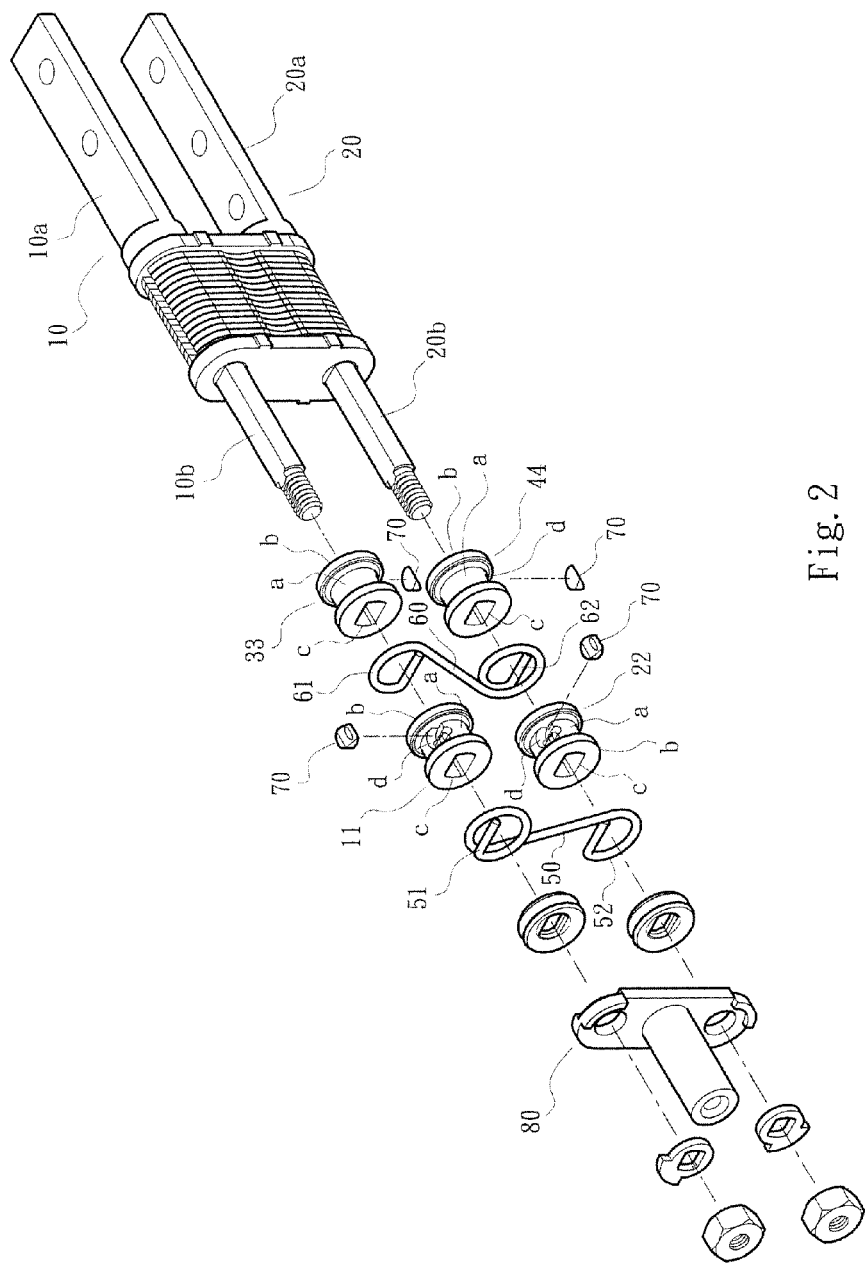
FIG. 2 is an exploded view of the present invention.

As shown in FIG. 1, FIG. 2 and FIG. 3, the dual-shaft synchronous motion device of the present invention comprises a first shaft 10 and a second shaft 20. The first shaft 10 and the second shaft 20 are mounted in a casing 30. The first and second shafts 10, 20 respectively have a fixed end 10a, 20a and a pivot end 10b, 20b. The fixed ends 10a, 20a cooperate with a fixed seat (not shown in the drawings), so that the first and second shafts 10, 20 are fixed to a display module 91 and a machine body module 92 of an electronic article 90, such as a cell phone, a computer or the like.

As shown in FIG. 1, FIG. 2 and FIG. 3, the pivot end 10b of the first shaft 10 comprises a first rotor 11 and a third rotor 33 which can be turned synchronously. The pivot end 20b of the second shaft 20 comprises a second rotor 22 and a fourth rotor 44 which can be turned synchronously. Tractive members 50, 60 are provided between the first, second, third and fourth rotors 11, 22, 33, 44. The first, second, third and fourth rotors 11, 22, 33, 44 and the tractive members 50, 60 in cooperation with a fixture assembly 80 are assembled on the first shaft 10 and the second shaft 20.

In an embodiment, the first, second, third and fourth rotors 11, 22, 33, 44 are in the form of a roller, and each have a cylindrical main body a and a shoulder portion b formed at two ends of the main body a. The width (or diameter) of the main body a is less than that of the shoulder portion b.

In the drawings, the first, second, third and fourth rotors 11, 22, 33, 44 each have a shaft hole c. The shaft hole c corresponds in shape to the cross-section of the pivot ends 10b, 20b of the first and second shafts 10, 20. For example, the pivot ends 10b, 20b of the first and second shafts 10, 20 and the shaft hole c have a rectangular cross-section, as shown in the drawings, so that the pivot hole c is pivoted to the pivot ends 10b, 20b of the first and second shafts 10, 20. The first and third rotors 11, 33 and the first shaft 10 are turned together. The second and fourth rotors 22, 44 and the second shaft 20 are turned together.

Referring to FIG. 2 and FIG. 3, the tractive member 50 is disposed between the first rotor 11 and the second rotor 22. The tractive member 60 is disposed between the third rotor 33 and the fourth rotor 44. The tractive members 50, 60 are in the form of a cable, and have first ends 51, 61 and second ends 52, 62. The first end 51 of the tractive member 50 is wound and fixed to the main body a of the first rotor 11, and the second end 52 of the tractive member 50 is wound and fixed to the main body a of the second rotor 22. The first end 61 of the tractive member 60 is wound and fixed to the main body a of the third rotor 33, and the second end 62 of the tractive member 60 is wound and fixed to the main body a of the fourth rotor 44.

In this embodiment, the main body a of each of the first, second, third and fourth rotors 11, 22, 33, 44 has an engaging hole d, such that the first and second ends 51, 61, 52, 62 of the tractive members 50, 60 are inserted through the respective engaging holes d and connected with a fixing portion 70. Therefore, the first and second ends 51, 61, 52, 62 of the tractive members 50, 60 won't disengage from the first, second, third and fourth rotors 11, 22, 33, 44. Besides, the shoulder portion b is used to confine the tractive members 50, 60 so that the tractive members 50, 60 won't disengage from the first rotor 11 (or the second rotor 22), the third rotor 33 (or the fourth rotor 44).

Referring to FIG. 2 and FIG. 3, the tractive member 50 connected between the first and second rotors 11, 22 and the tractive member 60 connected between the third and fourth rotors 33, 44 are wound in opposite directions. For example, the tractive member 50 is wound from the left of the first rotor 11 to the right of the second rotor 22, as shown in FIG. 3. On the contrary, the tractive member 60 is wound from the right of the third rotor 33 to the left of the fourth rotor 44. This configuration makes the first shaft 10 and the second shaft 20 turn in different directions.

Referring to FIG. 3 and FIG. 4, the display module 91 is closed on the machine body module 92, and the inclined angle of both is defined as 0 degree. When the operator opens the display module 91 for the first shaft 10 to bring the first rotor 11 (or the third rotor 33) to turn counterclockwise as shown in the drawings, the tractive member 50 pulls the second rotor 22 and forces the second rotor 20 to turn reversely (namely, to turn clockwise) relative to the turning direction of the first rotor 11. The operation movements are as follows:

1. The second shaft 20 is driven by the first shaft 10 to turn clockwise and to force the fourth rotor 44 to turn clockwise and the tractive member 60 cooperates with the third rotor 33 to turn so that the first and second shafts 10, 20 can turn synchronously.

2. The third rotor 33 cooperates with the first shaft 10 to turn counterclockwise and the tractive member 60 pulls the fourth rotor 44 to bring the second shaft 20 to turn clockwise so that the first and second shafts 10, 20 can turn synchronously.

Figure 6:
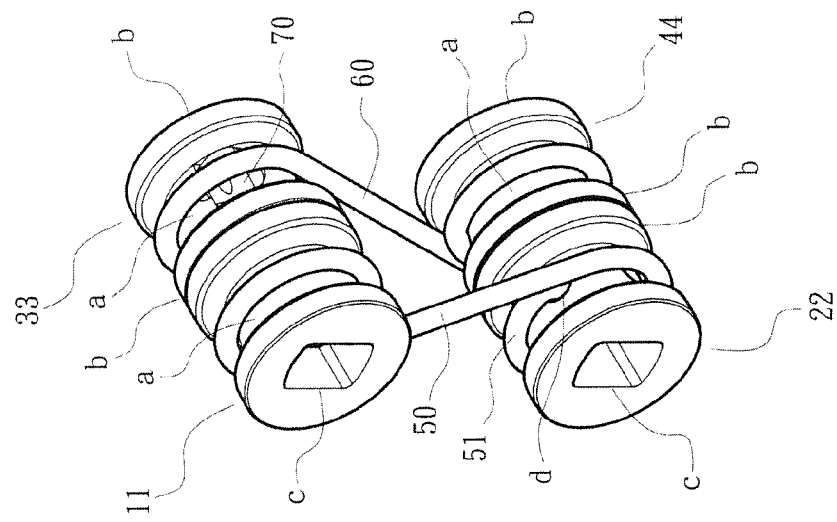
FIG. 6 is a perspective view of the first-four rotors and the tractive members of FIG. 5 to show the winding state of the first and second ends of the tractive members.
Figure 5:
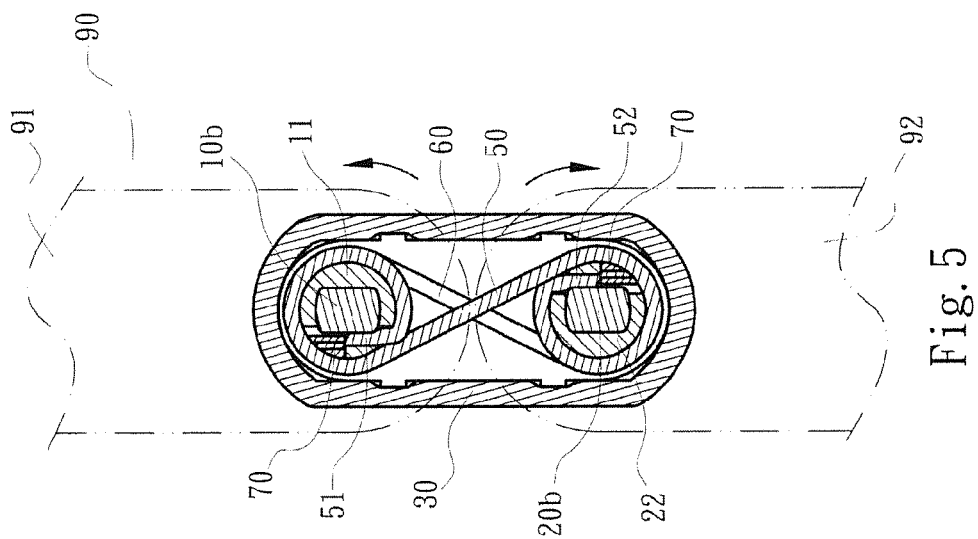
FIG. 5 is a schematic view of the present invention in an operating state that the display module and the machine body module are turned 90 degrees and the first and second shafts and the first-fourth rotors are driven to turn.
Figure 8:
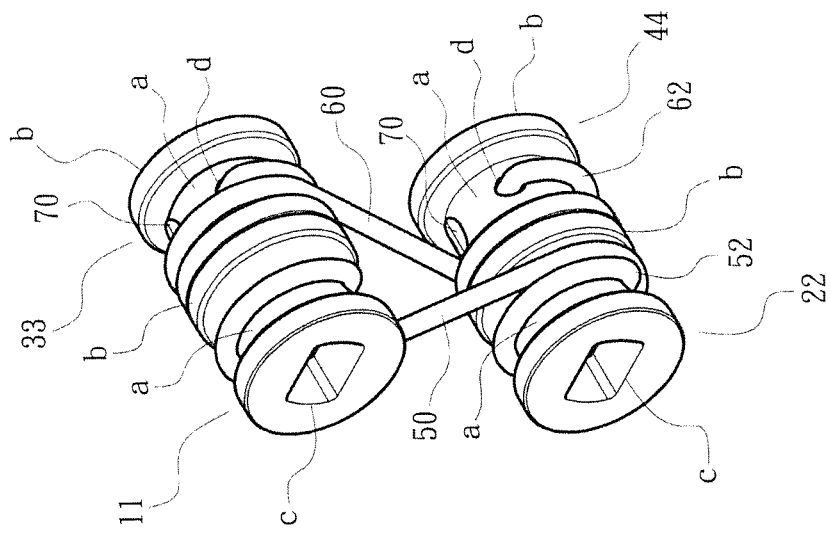
FIG. 8 is a perspective view of the first-four rotors and the tractive members of FIG. 7 to show the winding state of the first and second ends of the tractive members.
Figure 7:
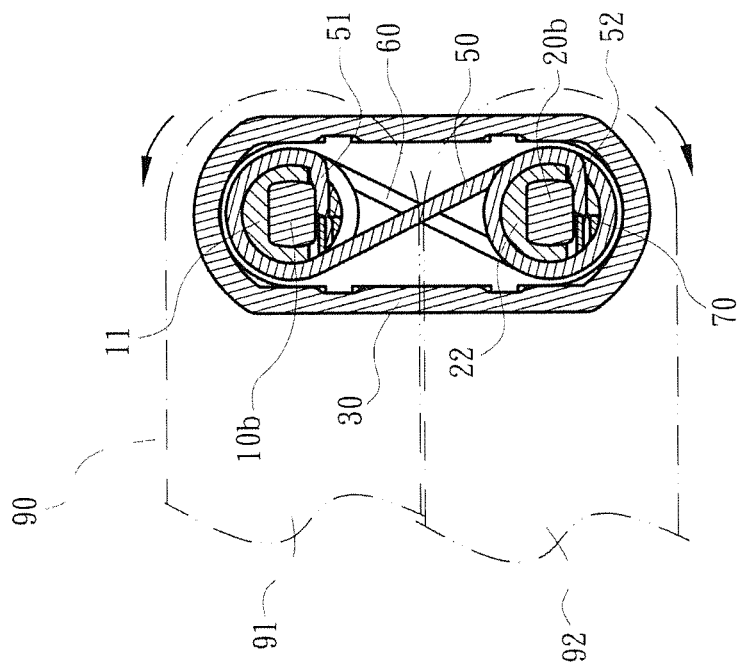
FIG. 7 is a schematic view of the present invention in an operating state that the display module and the machine body module are turned 180 degrees and the first and second shafts and the first-fourth rotors are driven to turn.

As shown in FIG. 5 and FIG. 6, when the operator opens the display module 91 to turn the first shaft 10 counterclockwise to the position of 90 degrees as shown in the drawings, the first, second, third and fourth rotors 11, 22, 33, 44 cooperates with the transmission of the tractive members 50, 60 and the second shaft 20 and the machine body module 92 are synchronously turned clockwise to the position of the 90 degrees, namely, the display module 91 and the machine body module 92 are turned 180 degrees. As shown in FIG. 7 and FIG. 8, when the operator opens the display module 91 to turn the first shaft 10 counterclockwise to the position of 180 degrees as shown in the drawings, the machine body module 92 are synchronously turned clockwise to the position of the 180 degrees, namely, the display module 91 and the machine body module 92 are turned 360 degrees.

That is, the synchronous motion device makes the user operate the display module 91 to turn an angle or range to get a double route of that turning angle or range, providing a quick operation effect.

In a preferable embodiment, after the first rotor 11 is turned 180 degrees along with the first shaft 10, the length of the tractive member 50 (or the first end 51), wound on the first rotor 11, is at least equal to or greater than a half of the periphery of the first rotor 11. That is to say, after the first rotor 11 is turned 180 degrees, the length of the first end 51 of the tractive member 50, wound on the first rotor 11, is equal to or greater than the distance (periphery) that the first rotor 11 is turned 90 degrees.

Similarly, after the fourth rotor 44 is turned 180 degrees along with the second shaft 20, the length of the tractive member 60 (or the second end 62), wound on the fourth rotor 44, is at least equal to or greater than a half of the periphery of the fourth rotor 44. That is to say, after the fourth rotor 44 is turned 180 degrees, the length of the second end 62 of the tractive member 60, wound on the fourth rotor 44, is equal to or greater than the distance (periphery) that the fourth rotor 44 is turned 90 degrees.

It is noted that the tractive member 50 (or 60) is tightly wound on the first and second rotors 11, 22 (or the third and fourth rotors 33, 44), so the torsion change of turning is decreased to the least for the first and second shafts 10, 20 to have a smooth turning. Besides, when the operator stops the operation of turning, the first and second shafts 10, 20 immediately stops turning to form a positioning effect.

Typically, compared to the prior art, the dual-shaft synchronous motion device of the present invention has the following advantages.

1. The assembly of the shafts (including the first shaft 10 and the second shaft 20) and the corresponding parts (such as the first rotor 11 and the second rotor 22 in cooperation with the tractive member 50; the third rotor 33 and the fourth rotor 44 in cooperation with the tractive member 60) constitutes a synchronous motion mechanism. This is different from the configuration to store and release energy by using multiple spacers, friction plates in cooperation with springs of the prior art.

The transmission structure of the first rotor 11 and the second rotor 22 (or the third rotor 33 and the fourth rotor 44) in cooperation with the tractive member 50 (or 60) provides a synchronous motion device mounted between the display module 91 and the machine body module 92. This allows that when the operator only operates the display module 91 to turn 0-180 degrees, the machine body module 92 will synchronously turn 0-180 degrees so that the total turning angle of the display module 91 and the machine body module 92 can achieve 360 degrees. That is to say, the synchronous motion device makes the user operate the display module 91 to turn an angle or range to get a double route of that turning angle or range. Under the condition that the electronic product 90 has various operation modes, the present invention provides an easy and convenient operation effect.

Accordingly, the present invention provides an effective dual-shaft synchronous motion device which has a different configuration from the prior art.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A dual-shaft synchronous motion device, comprising:
a first shaft (10) and a second shaft (20), the first shaft (10) and the second shaft (20) respectively having a fixed end (10a, 20a) and a pivot end (10b, 20b);
a first rotor (11) and a third rotor (33) disposed on the first shaft (10) and turned synchronously;
a second rotor (22) and a fourth rotor (44) disposed on the second shaft (20) and turned synchronously;
a first tractive member (50) disposed between the first rotor (11) and the second rotor (22); and
a second tractive member (60) disposed between the third rotor (33) and the fourth rotor (44);
the first and second tractive members (50, 60) respectively link the first shaft (10) and the second shaft (20) to turn synchronously in opposite directions;
wherein the first, second, third and fourth rotors (11, 22, 33, 44) are in the form of a roller and each have a cylindrical main body (a) and a shoulder portion (b) formed at two ends of the main body (a).

2. The dual-shaft synchronous motion device as claimed in claim 1, wherein the cylindrical main body (a) has a diameter less than that of the diameter of the shoulder portion (b).

3. The dual-shaft synchronous motion device as claimed in claim 2, wherein the tractive member (50) wound from the first rotor (11) to the second rotor (22) and the tractive member (60) wound from the third rotor (33) to the fourth rotor (44) are wound in opposite directions so that the first shaft (10) and the second shaft (20) are turned in different directions.

4. The dual-shaft synchronous motion device as claimed in claim 3, wherein the first shaft (10) is turned in the range of 0-180 degrees, and the second shaft (20) is turned synchronously and reversely in the range of 0-180 degrees.

5. The dual-shaft synchronous motion device as claimed in claim 1, wherein the first, second, third and fourth rotors (11, 22, 33, 44) each have a shaft hole (c);
the shaft hole (c) corresponds in shape to the pivot ends (10b, 20b) of the first and second shafts (10, 20);
the shaft hole (c) is pivoted with the pivot ends (10b, 20b) of the first and second shafts (10, 20);
the first and third rotors (11, 33) and the first shaft (10) are turned together; and
the second and fourth rotors (22, 44) and the second shaft (20) are turned together.

6. The dual-shaft synchronous motion device as claimed in claim 5, wherein the pivot ends (10b, 20b) and the shaft hole (c) have a rectangular cross-section.

7. The dual-shaft synchronous motion device as claimed in claim 6, wherein the tractive member (50) wound from the first rotor (11) to the second rotor (22) and the tractive member (60) wound from the third rotor (33) to the fourth rotor (44) are wound in opposite directions so that the first shaft (10) and the second shaft (20) are turned in different directions.

8. The dual-shaft synchronous motion device as claimed in claim 7, wherein the first shaft (10) is turned in the range of 0-180 degrees, and the second shaft (20) is turned synchronously and reversely in the range of 0-180 degrees.

9. The dual-shaft synchronous motion device as claimed in claim 5, wherein the first and second tractive members (50, 60) are in the form of a cable and have respective first ends (51, 61) and second ends (52, 62); the first end (51) of the first tractive member (50) is wound and fixed to the main body (a) of the first rotor (11); the second end (52) of the first tractive member (50) is wound and fixed to the main body (a) of the second rotor (22); the first end (61) of the second tractive member (60) is wound and fixed to the main body (a) of the third rotor (33); and the second end (62) of the second tractive member (60) is wound and fixed to the main body (a) of the fourth rotor (44).

10. The dual-shaft synchronous motion device as claimed in claim 9, wherein the main body (a) of each of the first, second, third and fourth rotors (11, 22, 33, 44) has an engaging hole (d); and the first and second ends (51, 61, 52, 62) of the first and second tractive members (50, 60) are inserted through the respective engaging hole (d) and connected with a fixing portion (70).

11. The dual-shaft synchronous motion device as claimed in claim 10, wherein the tractive member (50) wound from the first rotor (11) to the second rotor (22) and the tractive member (60) wound from the third rotor (33) to the fourth rotor (44) are wound in opposite directions so that the first shaft (10) and the second shaft (20) are turned in different directions.

12. The dual-shaft synchronous motion device as claimed in claim 11, wherein the first shaft (10) is turned in the range of 0-180 degrees, and the second shaft (20) is turned synchronously and reversely in the range of 0-180 degrees.

13. The dual-shaft synchronous motion device as claimed in claim 9, wherein the tractive member (50) wound from the first rotor (11) to the second rotor (22) and the tractive member (60) wound from the third rotor (33) to the fourth rotor (44) are wound in opposite directions so that the first shaft (10) and the second shaft (20) are turned in different directions.

14. The dual-shaft synchronous motion device as claimed in claim 13, wherein the first shaft (10) is turned in the range of 0-180 degrees, and the second shaft (20) is turned synchronously and reversely in the range of 0-180 degrees.

15. The dual-shaft synchronous motion device as claimed in claim 5, wherein the tractive member (50) wound from the first rotor (11) to the second rotor (22) and the tractive member (60) wound from the third rotor (33) to the fourth rotor

(44) are wound in opposite directions so that the first shaft (10) and the second shaft (20) are turned in different directions.

16. The dual-shaft synchronous motion device as claimed in claim 15, wherein the first shaft (10) is turned in the range of 0-180 degrees, and the second shaft (20) is turned synchronously and reversely in the range of 0-180 degrees.

17. The dual-shaft synchronous motion device as claimed in claim 1, wherein the tractive member (50) wound from the first rotor (11) to the second rotor (22) and the tractive member (60) wound from the third rotor (33) to the fourth rotor (44) are wound in opposite directions so that the first shaft (10) and the second shaft (20) are turned in different directions.

18. The dual-shaft synchronous motion device as claimed in claim 17, wherein the first shaft (10) is turned in the range of 0-180 degrees, and the second shaft (20) is turned synchronously and reversely in the range of 0-180 degrees.

19. The dual-shaft synchronous motion device as claimed in claim 1, wherein after the first rotor (11) is turned 180 degrees along with the first shaft (10), the length of the first tractive member (50), wound on the first rotor (11), is at least equal to a half of the periphery of the first rotor (11).

20. The dual-shaft synchronous motion device as claimed in claim 1, wherein after the first rotor (11) is turned 180 degrees, the length of the first end (51) of the first tractive member (50), wound on the first rotor (11), is greater than a periphery distance that the first rotor (11) is turned 90 degrees.

21. The dual-shaft synchronous motion device as claimed in claim 1, wherein after the fourth rotor (44) is turned 180 degrees along with the second shaft (20), the length of the second tractive member (60), wound on the fourth rotor (44), is at least equal to a half of the periphery of the fourth rotor (44).

22. The dual-shaft synchronous motion device as claimed in claim 1, wherein after the fourth rotor (44) is turned 180 degrees, the length of the second end (62) of the second tractive member (60), wound on the fourth rotor (44), is equal greater than a periphery distance that the fourth rotor (44) is turned 90 degrees.

23. The dual-shaft synchronous motion device as claimed in claim 1, wherein the first shaft (10) and the second shaft (20) are mounted in a casing (30).

24. The dual-shaft synchronous motion device as claimed in claim 1, wherein the fixed ends (10a, 20a) of the first and second shafts (10, 20) cooperate with a fixed seat for the first and second shafts (10, 20) to be fixed to a display module (91) and a machine body module (92) of an electronic article (90).

25. The dual-shaft synchronous motion device as claimed in claim 24, wherein the display module (91) drives the first shaft (10) to turn in the range of 0-180 degrees, and the second shaft (20) and the machine body module (92) are turned synchronously and reversely in the range of 0-180 degrees.

26. The dual-shaft synchronous motion device as claimed in claim 1, wherein the first, second, third and fourth rotors (11, 22, 33, 44) and the first and second tractive members (50, 60) in cooperation with a fixture assembly (80) are assembled on the first shaft (10) and the second shaft (20).

27. The dual-shaft synchronous motion device as claimed in claim 1, wherein the first shaft (1) drives the first and third rotors (11, 33), the first tractive member (50) brings the second rotor (22) to turn reversely relative to the first rotor (11), and the fourth rotor (44) makes the second tractive member (60) drive the third rotor (33).

* * * * *